Patented July 10, 1934                                                              1,966,111

UNITED STATES PATENT OFFICE 1,966,111

LUBRICATING OIL AND METHOD OF MAKING THE SAME

Arman E. Becker, Elizabeth, N. J., and William S. Davis, Jr., Reading, Pa., assignors to Standard Oil Development Company, a corporation of Delaware No Drawing. Application January 20, 1930, Serial No. 422,216

11 Claims. (Cl. 196—151)

This invention relates to lubricating oils, and more specifically to oils used in the lubrication of steam turbines.

One object of the invention is to manufacture turbine oils which show increased resistance to emulsification and sludge formations.

Another object is the manufacture of turbine oil which will not develop any appreciable acidity during their use.

Other objects and advantages will be apparent in the course of the following description.

Among the characteristics of a good turbine oil is the resistance to emulsification and sludge formation; sludge being a combination of emulsion and insoluble oxidized material. Turbine bearings are large, well grooved and well supplied with oil so that there is little danger of lubrication failure as long as the oil remains in good condition. However, in the very prolonged use to which the oil is subjected it gradually develops insoluble oxidation products of an asphaltic nature. These may deposit in the bearings and cause high friction, clog up oil feed lines, act as emulsifying agent to give stable emulsions with water and cause other trouble.

A petroleum product refined by treatment with sulphuric acid, then with sodium hydroxide solution and filtered through a decolorizing agent such as clay for a color (Robinson) of 10 to 12, with physical characteristics of the following order, gravity from 20° to 30° A. P. I., flash 300° to 400° F., fire 350° to 500° F., viscosity at 100° F. in seconds (Saybolt Universal) of 125 to 350 seconds, and cold test of 0° to 30° F. will hereafter be referred to as pale oil. Another petroleum product of similar physical characteristics refined further with a stronger treatment with sulphuric acid, then with sodium hydroxide and filtering through a decolorizing agent such as clay for a color (Saybolt) of 25+ will hereafter be referred to as white oil.

It has for a long time been considered that the degree of refining of an oil was a measure of its stability. If a pale oil and a white oil are subjected to oxidation by air under identical conditions the pale oil develops sludge and becomes turbid while the white oil proves to be very resistant to sludge formation. We have subjected the following two oils to comparative tests:

|  | Pale oil | White oil |
|---|---|---|
| Gravity, °A. P. I. | 29.0 | 29.8 |
| Flash °F | 385 | 345 |
| Fire °F | 450 | 395 |
| Viscosity at 100° F. in seconds (Saybolt universal) | 152 | 159 |
| Cold test °F | 30 | 20 |
| Color (Robinson) | 11¾ | 30+Saybolt. |
| Carbon (Conradson) | 0.015% |  |

Three hundred grams of each oil were subjected to oxidation by blowing about 10 cubic feet of air through same per hour. The tests lasted for a period of four hours and were carried out at various temperatures. The color of the pale oil darkened gradually as the temperature of oxidation was increased. At 350° F. the color suddenly dropped to less than 1, which is a sign of sludge formation. The white oil also became discolored gradually, but there was no sudden break and the color had a value of 17 Robinson even after the oxidation test at 350° F. We may therefore conclude that the white oil did not develop sludge on these oxidation tests. After each test we also determined the acidity as expressed in milligrams of KOH per gram of oil. The pale oil showed no acidity up to 300° F. and very little above this temperature while the acidity of the white oil suddenly rose to 4 mg KOH per gram of oil at 300° F.

We have discovered that a blend of these two oils shows the characteristics of the white oil as regards its gradual change of color on oxidation test and the characteristics of the pale oil as regards stability against acid formation. The best results were obtained with a blend having approximately 40–70% of pale oil with 60–30% of white oil. 35% Acto (commercial white oil) and 65% Manchester spindle was the best. Such a blend proved to be a superior lubricating oil being extremely resistant to acid formation and sludge formation during its use and contact with air. In one oxidation test with 10 cu. ft. of air per hour for 12 hours at 300° F. the following results were obtained:

|  | Acidity developed (mg. KOH per gm. oil) |
|---|---|
| Pale oil | 0.54 |
| 65% pale oil+35% white oil | 0.09 |
| White oil | 6.74 |

The blend showed a lower acidity development than either oil alone and also formed less sludge than the pale oil.

For turbine oils we usually blend a pale oil having a viscosity of 145–160 seconds Saybolt at 100° F., color 8–12 (Robinson), and a white oil having the same viscosity with a color better than 30 Saybolt. The blend has a color between 13 and 18 (Robinson). Some turbines require a higher viscosity and we select a pale oil and a white oil of higher viscosity. Usually white oils are not available with viscosity much higher than 400 seconds at 100° F., but our method will also be available for the manufacture of more viscous oils by blending a white oil of say 350 seconds at 100° F. with a much higher viscosity pale oil.

We do not know the exact reason of the superior behavior of lubricating oils consisting of a blend of white and pale oil. The pale oil seems to stabilize the white oil against acid formation while the white oil seems to render the pale oil resistant to sludge formation.

It will be understood that we do not wish to limit this invention to the particulars and examples given by way of illustration, but only by the appended claims in which it is our intention to claim all novelty inherent to this invention.

What we claim is:

1. The method of rendering pale lubricating oils resistant to sludge formation which comprises admixing white lubricating oil with the pale lubricating oil.

2. The method according to claim 1 in which the white lubricating oil has a viscosity of less than 400 seconds Saybolt at 100° F.

3. A lubricating oil characterized by resistance to sludge formation and development of acidity and comprising a mixture of a pale lubricating oil tending to form sludge and a white lubricating oil tending to develop acidity.

4. A lubricating oil resistant to sludge and acid formation comprising a mixture of about 40-70% pale lubricating oil and 60-30% white lubricating oil.

5. The method of rendering pale lubricating oils resistant to sludge formation, which comprises admixing white lubricating oil having approximately the same viscosity at 100° F. with the pale lubricating oil.

6. The method according to claim 5, in which both the pale oil and the white oil have a viscosity of from 145 to 160 seconds Saybolt at 100° F.

7. The method of preparing petroleum oil lubricants which comprises blending together a highly refined colorless hydrocarbon lubricating oil normally tending to develop acidity in use, and a pale lubricating oil less highly refined and tending to form sludge in use, whereby a stabilized blend is produced which is superior to either of said individual oils in respect to both sludge formation and acidity development.

8. Lubricating oil composition comprising a highly refined colorless hydrocarbon lubricating oil normally tending to develop acidity in use, and a lubricating oil less highly refined and tending to counteract the development of acidity.

9. Lubricating oil composition comprising a pale lubricating oil normally tending to form sludge in use, and a highly refined colorless hydrocarbon oil tending to reduce the formation of sludge in said composition.

10. A composition comprising a petroleum white oil having a Saybolt viscosity of about 350 seconds at 100° F. and a pale lubricating oil of much higher viscosity.

11. A new composition especially adapted for lubricating turbines, comprising 40 to 70% of a light lubricating oil having a color of about 8 to 12 (Robinson) and 60 to 30% of a highly refined mineral oil of approximately the same viscosity, having a color better than about 30 (Saybolt).

ARMAN E. BECKER.
WILLIAM S. DAVIS, Jr.